US012692967B1

(12) United States Patent　　(10) Patent No.:　US 12,692,967 B1
Jackson　　　　　　　　　　　　(45) Date of Patent:　Jul. 28, 2026

(54) UNIVERSAL PIPE REPAIR SYSTEM

(71) Applicant: Herbert Jackson, Thousand Palms, CA (US)

(72) Inventor: Herbert Jackson, Thousand Palms, CA (US)

( * ) Notice: Subject to any disclaimer, the term of this patent is extended or adjusted under 35 U.S.C. 154(b) by 0 days.

(21) Appl. No.: 19/264,813

(22) Filed: Jul. 9, 2025

(51) Int. Cl.
　　*F16L 55/18*　　(2006.01)
　　*F16L 43/00*　　(2006.01)
(52) U.S. Cl.
　　CPC .............. *F16L 55/18* (2013.01); *F16L 43/00* (2013.01)
(58) Field of Classification Search
　　CPC .................................. F16L 55/18; F16L 43/00
　　USPC ............................................................. 138/97
　　See application file for complete search history.

(56) References Cited

U.S. PATENT DOCUMENTS

| | | | | |
|---|---|---|---|---|
| 4,639,016 | A * | 1/1987 | Rogers ................ | F16L 55/1608 |
| | | | | 285/31 |
| 5,778,935 | A * | 7/1998 | Koch .................. | F16L 55/1608 |
| | | | | 138/120 |
| 8,127,799 | B2 * | 3/2012 | Cortez ................ | F16L 55/1608 |
| | | | | 138/155 |
| 10,604,920 | B2 * | 3/2020 | Schumacher ............. | E03C 1/22 |
| 2020/0072404 | A1 * | 3/2020 | Riddle .................. | F16L 13/116 |

OTHER PUBLICATIONS

By jcolino in Outside > Backyard, "How to Repair Sprinkler PVC Pipe When You Don't Have Much Room", Sep. 16, 2021, https://www.instructables.com/How-to-Repair-Sprinkler-PVC-Pipe-When-You-Dont-Hav/ (Year: 2021).*

* cited by examiner

*Primary Examiner* — David R Deal
(74) *Attorney, Agent, or Firm* — Donn K. Harms

(57) ABSTRACT

A pipe repair system is provided which is positionable to a repair position in a gap between two sections of a broken pipe. The system includes a U-shaped connector which is engageable with engagement ends of two right angle connectors which have slip sockets at opposite ends which are adapted to couple to the two opposing broken sections of pipe.

20 Claims, 11 Drawing Sheets

Slide on U-Shaped Connector

Slide on U-Shaped Connector and Let Glue Cure

Align Edge With Slide Line if Present

UNIVERSAL PIPE REPAIR SYSTEM

BACKGROUND OF THE INVENTION

1. Field of the Invention

The invention herein disclosed relates generally to pipe systems for water and the like. More particularly, it relates to a repair kit having three components, which is adapted for the repair, or retrofit, of damaged pipe systems such as those employed for irrigation.

2. Prior Art

BACKGROUND OF THE INVENTION

Plastic pipe systems are widely used in modern irrigation of crops, homes, and business landscapes. This is primarily due to the durability of such polymeric pipe systems over time as well as the cost-effectiveness, and ease of installation.

Such plastic based water distribution systems primarily form the pipe components from polymeric materials such as PVC (polyvinyl chloride), HDPE (high-density polyethylene), and LDPE (low-density polyethylene). Each of these different plastics is considered conventionally well suited for different irrigation methods.

PVC based pipe systems are commonly used for underground mainlines and laterals because of its rigidity and high-pressure tolerance. HDPE and LDPE pipe systems and components are more flexible and are ideal for surface or drip irrigation systems.

One of the key advantages of plastic based pipe systems is the resistance to corrosion and chemical damage once positioned for use. This advantage is especially important in agricultural environments such as home landscapes and business landscapes where fertilizers and other chemicals are frequently used.

Due to the nature of their manufacture, such plastic based pipes also have very smooth inner surfaces. Such smooth surfaces reduce friction loss and minimize turbulent fluid flow, which helps ensure efficient water flow initially and over time as the pipes age. As a result, water communicated through such plastic based pipe and components is delivered more effectively to yards and crops, helping to conserve resources and reduce energy consumption related to pumping.

Plastic pipe systems support a range of irrigation methods, including drip irrigation, sprinkler systems, and center pivots. Drip irrigation, in particular, benefits greatly from plastic pipe and engageable tubing, as it allows for constant water flow, which may be then directed through tubing for precise control of water delivery directly to the root zones of plants. This reduces water wastage and improves crop yields. Flexible plastic tubing can also be easily repositioned or extended as planting patterns change, adding to the system's versatility.

However, despite their benefits, plastic pipe systems are not without challenges. In some cases, the plastic pipe and engaged fittings can degrade under prolonged exposure to ultraviolet light, although UV-stabilized variants are available to address this issue. Additionally, unlike metal pipe, plastic pipe systems are always subject to damage from impacts and compression such as from weight communicated to underlying pipes from vehicles and heavy components positioned on overhead soil. Nonetheless, when properly maintained and managed, plastic pipe systems remain a reliable and efficient choice for modern irrigation needs.

The forgoing background concerning the conventional manufacture and use of plastic based pipe systems, and any limitations related therewith, are intended to be illustrative and not exclusive, and they do not imply any limitations on the universal pipe repair system herein. Various other limitations of the related art of plastic pipe water distribution systems are well known or will become apparent to those skilled in the art upon a reading and understanding of the specification below and the accompanying drawings.

SUMMARY OF THE INVENTION

The disclosed device herein provides for the easy repair and retrofit of plastic pipe systems carrying water and the like, such as with sprinkler systems. The device is formed of three engageable components, which include a center connector which is substantially U-shaped, and a first right angle connector and a second right angle connector, each of which is configured to couple with one respective end of the center connector.

The center connector has an axial passage running therethrough which has a constant diameter running between a first slip socket on one end of the center connector, and a second slip socket on the opposite end of the center connector. This axial passage has a constant inner diameter so as to help maintain a laminar flow therethrough. The center connector has a first slip socket at a first end and a second slip socket at the opposite end.

The first right angle connector has a first passageway extending between an opening in a slip socket at one end and an engagement end. The second right angle connector has a similar configuration with a second passageway extending from an opening in the slip socket at one end thereof and an engagement end of the second right angle connector.

The first passageway of the first right angle connector and the second passageway of the second right angle connector are substantially equal in an interior diameter as the axial passage of the center connector. This is important to minimize turbulence in the fluid flow of the connected components.

The engagement end on the first right angle connector has an outer circumference sized to form a sliding coupling with the interior surface of the first slip socket on the center connector, which is sized to form that sliding coupling. This is similar to the engagement end on the second right angle connector which is sized for a sliding coupling with the interior surface of the second slip socket opening on the U shaped center connector. Thus, prior to adhering the components together such as with plastic pipe cement, the first right angle connector is rotatable within the first slip socket of the U shaped connector and the second right angle connector is rotatable with the second slip socket within the U shaped center connector. This rotational coupling allows the user to position the opening in the connector slip socket of the first right angle connector in alignment with one end of the broken pipe, and the opening in the slip socket of the second right angle connector in alignment with the second portion of the broken pipe, which may require rotating the first and second right angle connectors to do so.

To maximize the alignment of the first passageway with the internal passage of the U shaped connector to minimize any formation of a turbulent fluid flow, a first slide line is positioned on the exterior surface of the first right angle connector around the engagement end. The first slide line is a distance from the end edge of the first right angle connector, which is substantially equal to a distance from the distal edge surrounding the opening of the first slip socket to a shoulder within the first slip socket. The second slide line around the engagement end of the second right angle connector is at a distance from the end edge of the second right angle connector, which is substantially equal to a distance from the edge surrounding a second opening of the second slip socket of the U shaped connector, to a second shoulder within the second slip socket.

The marking and positioning of the slide lines on the exterior of the engagement ends of the right angle connectors positions them to be visible and align with the edges of the U-shaped connector surrounding the openings to the two slip sockets. The first slide line aligning with the first edge surrounding the first opening thus defines a visual gauge for the user so that the first right angle connector slid into the first slip socket with contact of an end edge with a shoulder within first slip socket is insured. The second slide line around the engagement end of the second right angle when aligned with the second edge of the second opening also provides a visual gauge to insure that when the second right angle connector is slid into the second slip socket, such that the end edge contacts against a second shoulder within the second slip socket.

This contact of the end edges with the respective shoulders, insures that no gaps are formed between the inserted portions and the two shoulders. The prevention of such gaps insures that fluid flowing through the first passageway of the first right angle connector into the center connector, and from the center connector into the second passageway of the second right angle connector does not contact any gaps which would create turbulence.

Once the user has the first right angle connector with the first slip socket and the second right angle connector within the second slip socket, and the first right angle connector aligned with one portion of the pipe being repaired and the second right angle connector aligned with the second portion of the pipe being repaired, connections may be cemented into the first and second slip sockets in the aligned positions.

To aid in the elimination of gaps between the interior surfaces of the first right angle connector and the second right angle connector and the first portion and second portion of the pipe being repaired, a circumferential marking, or raised shoulder, will provide the user a visual gauge to mark a marked slide line onto the first portion of the pipe being repaired and second portion thereof. The two marked slide lines allow the user to make sure there are no gaps in the interior wall of the connected parts.

In some instances, the first portion of the pipe being repaired may be at a higher elevation than the second portion of the pipe being repaired. The device herein can provide for such an occurrence through the inclusion of a second right angle connector, which has an elongated linear section running between the engagement end and the curve in the second right angle connector. This elongated linear section is configured to be cut or trimmed to a length allowing the second right angle connector to with the second portion of pipe being repaired, where it is at a lower elevation than the first portion of the pipe being repaired.

The device may be provided in a kit wherein first right angle connectors and second right angle connectors have equal linear sections, and one or more second right angle connectors with elongated linear sections which may be trimmed as needed.

A sprinkler repair on insertion version of the device herein may also be provided. Such will allow for the replacement of a sprinkler where the pipe providing fluid thereto is broken. The sprinkler repair mode of the device will include a threaded projection exiting from the central area of the curve of the U-shaped center connector. A new or replacement sprinkler may be operatively coupled to the threaded projection, and will receive water from the axial passage of the center connector once all the components are aligned and cemented into place.

With respect to the above description, before explaining at least one preferred embodiment of the universal pipe repair system herein, it is to be understood that the invention is not limited in its application to the details of operation, nor the arrangement of the components or the steps set forth in the following description or illustrations in the drawings. The components hereof and various methods of implementation and operation of the universal pipe repair system herein, are capable of other embodiments and of being practiced and carried out in various ways, which will be obvious to those skilled in the art once they review this disclosure. Also, it is to be understood that the phraseology and terminology employed herein are for the purpose of description of the components and overall use of the pipe repair system herein, and should not be regarded as limiting.

Therefore, those skilled in the art will appreciate that the conception upon which this disclosure is based may readily be utilized as a basis for the designing of other assembled-component pipe repair systems, and for carrying out the several purposes of the disclosed universal pipe repair device and system herein. Therefore, that the objects and claims herein should be regarded as including such equivalent construction, steps, and methodology insofar as they do not depart from the spirit and scope of the present invention.

It is an object of this invention to provide a kit of components which is easily configured to multiple different assembled configurations to allow for the easy repair of an existing plastic pipe water delivery and irrigation system.

It is a further object of this invention to provide, such a plastic pipe repair system which employing only three components is easily configured in multiple configurations to provide a sealed conduit repair of an existing plastic pipe water delivery system.

It is an additional object of this invention to provide such a plastic pipe repair system wherein some components include visual gauges to allow the user to mark components and to discern proper abutting engagement between the components for a desired repair.

It is yet an additional object of this invention in some modes to provide user configurable components for engagement to those in the kit where gauges are provided on the pipe components themselves to allow for proper measurements and cutting to achieve optimum results.

These together with other objects and advantages, which become subsequently apparent, reside in the details of the construction and operation of the universal pipe repair system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification, wherein detailed description is for the purpose of fully disclosing the invention without placing limitations thereon.

BRIEF DESCRIPTION OF DRAWING FIGURE

FIG. 1 shows a view of the three components of the repair system herein, where two right angle connectors yielding a ninety degree turn of the internal passageways thereof are engageable with a U-shaped center connector at multiple angles and distances noted in the other drawings herein, and showing the preferred gauge and slide lines allowing user measuring and marking for confirmation of proper abutting insertion.

FIG. 3A depicts the components of the system shown in FIG. 3 shown assembled with the slide lines on both of the right angle connectors positioned in alignment with the external edge of each slip socket showing proper engagement.

DETAILED DESCRIPTION OF THE PREFERRED EMBODIMENTS OF THE INVENTION

Figure 1:
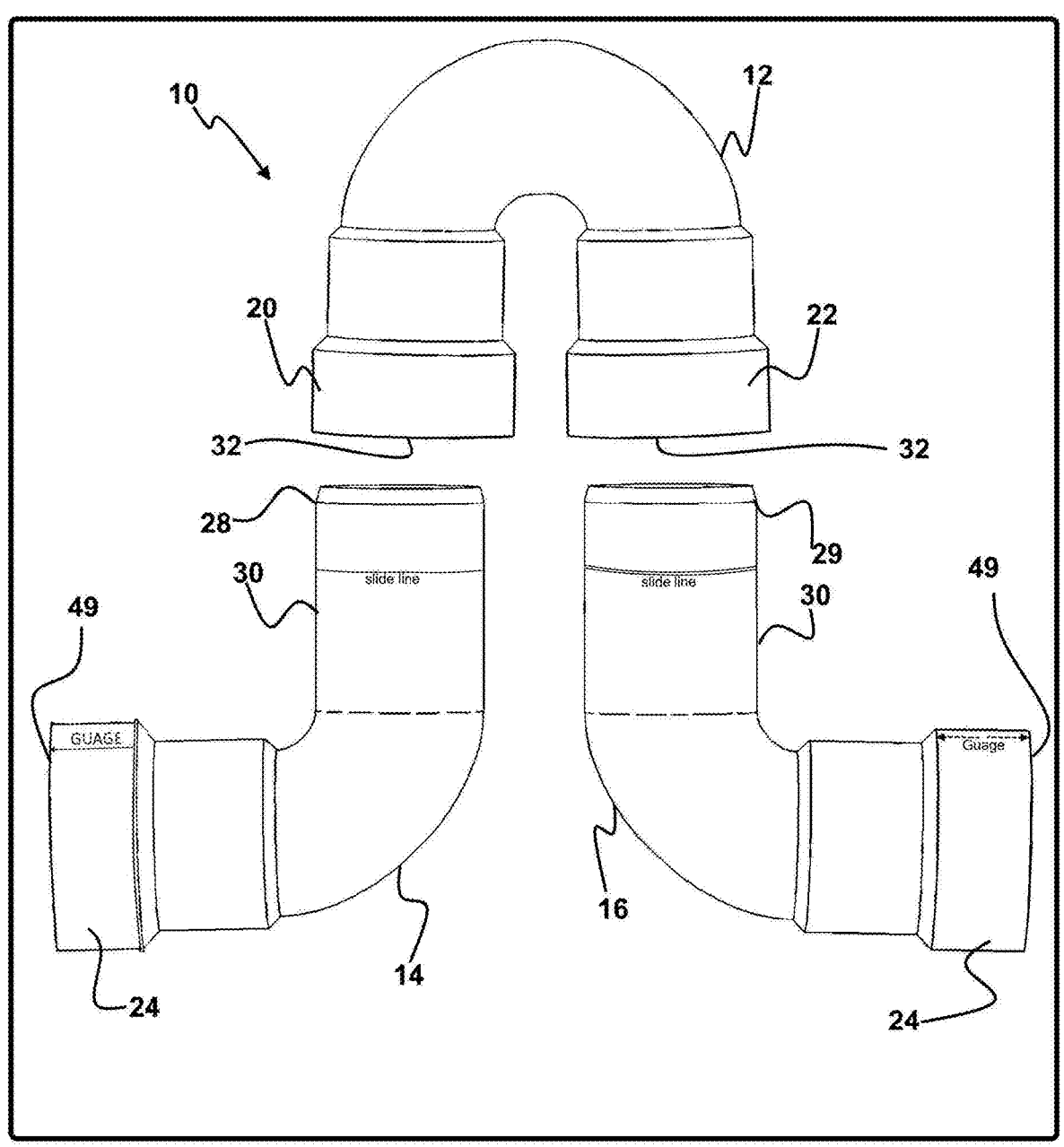

In this description, the directional prepositions of up, upwardly, down, downwardly, front, back, top, upper, bottom, lower, left, right, and other such terms refer to the universal pipe repair device and system as it is oriented and appears in the drawings, and are used for convenience only. Any such terms are not intended to be limiting or to imply that the pipe repair system or components has to be used or positioned in any particular orientation.

Figure 2:
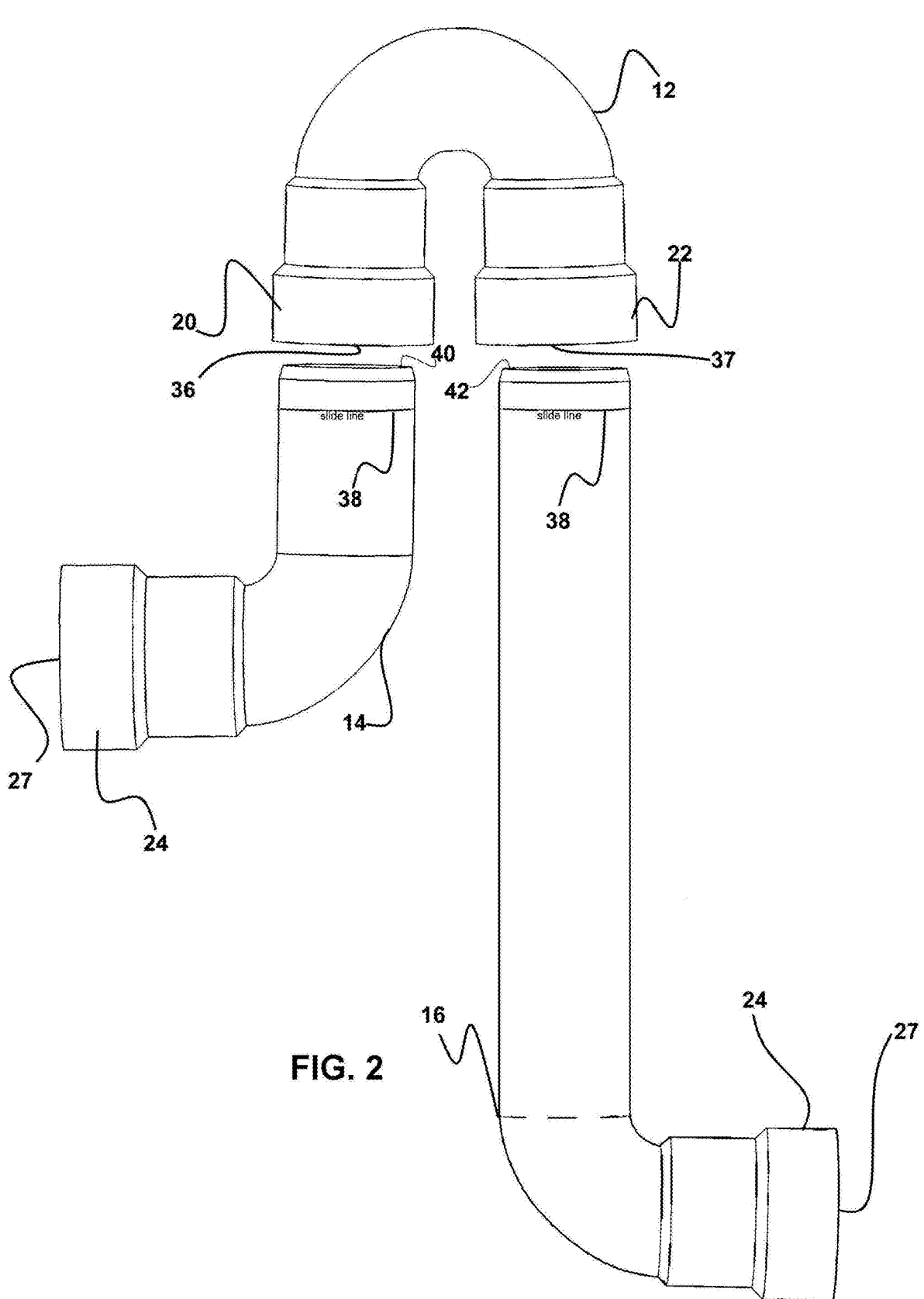
FIG. 2 shows a configuration of the three components of the repair system herein, wherein one of the right angle connectors has an elongated spigot section which is longer than that of the second right angle connector, and may be trimmed to size to allow for an uneven alignment of input and output of the pipe being repaired.
Figure 3:
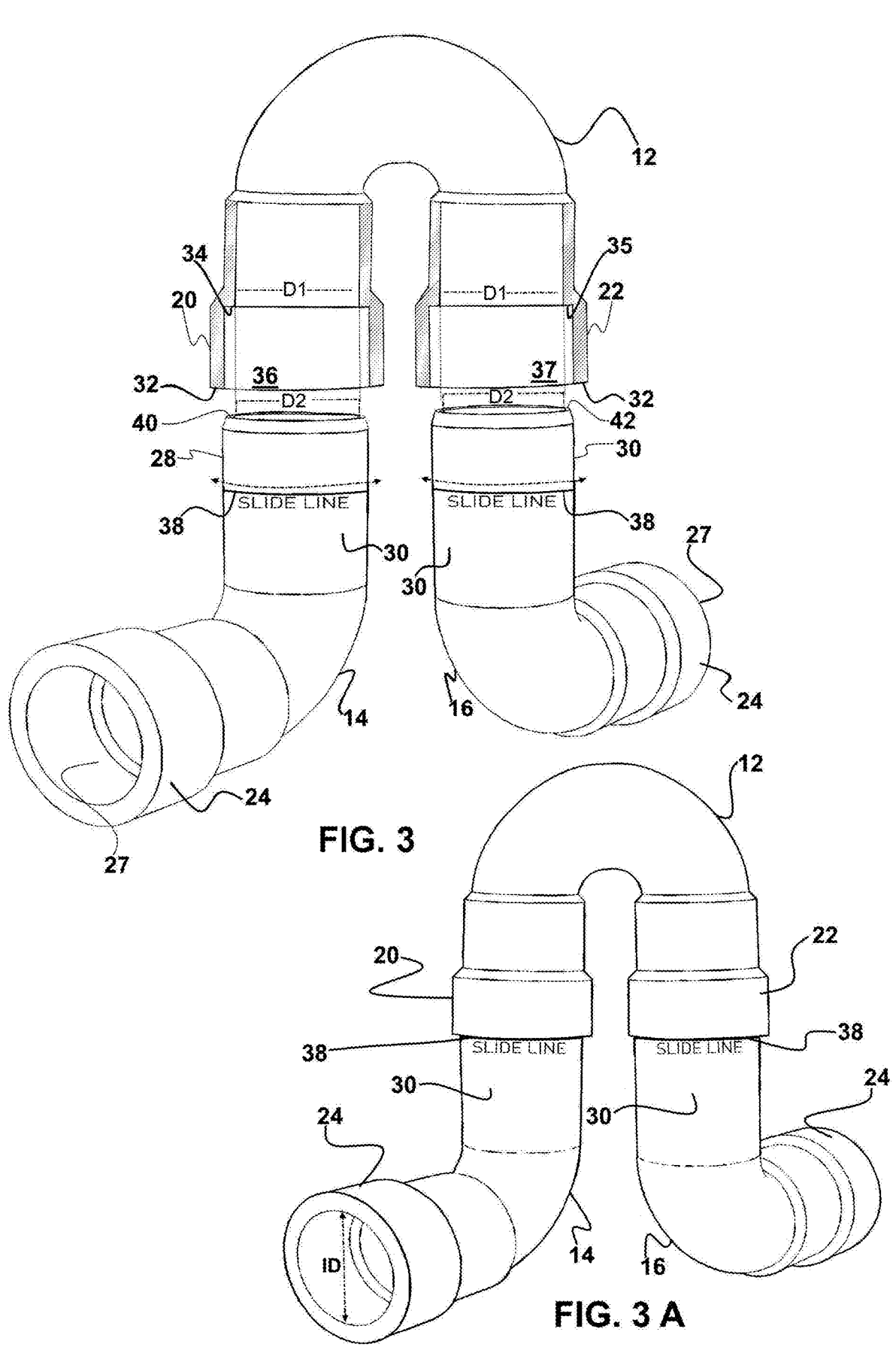
FIG. 3 shows the functionality of all configurations of the universal pipe repair system herein, wherein the two right angle connectors are rotatable on their spigot ends relative to each other to allow for differing angles of input and output of the pipe being repaired.

Now referring to drawings in FIGS. 1-18, there can be seen in FIGS. 1-3 a view of the three components common to all configurations of the repair system 10 herein. As shown, the system 10 includes a U-shaped connector 12 and includes a first right angle connector 14. The U-shaped connector 12 has an internal passage 18 (FIG. 4) communicating between a first opening within a first slip socket 20 and a second opening within a second slip socket 22.

The first right angle connector 14 and the second right angle connector 16 each has a connector slip socket 24 at one end thereof, which is configured for operative coupling with an existing pipe 26 (FIG. 4) which is being engaged by the system 10 for repair or retrofit. The second right angle connector 16 also has a connector slip socket 24, which is also configured for operative coupling with the existing pipe 26 on a job site where the system 10 is employed. By operative coupling is meant that the interior diameter "ID" (FIG. 3A) of each of the connector slip sockets 24 is sized substantially equal to, or slightly larger than, the outside diameter "OD" (FIG. 4) of the existing pipe, such that a frictional engagement may be achieved between the connector slip socket 24 and the existing pipe 26 which may be formed to a permanent connection with glue or adhesive contacting both during an insertion in a conventional fashion with such polymeric and plastic pipe systems.

A first end 28 of the first right angle connector 14 has a linear section 30 with an outside diameter which is sized for a frictional coupling within an opening 36 formed at the end of the first slip socket 20, which extends from an exterior edge 32 of the first slip socket 20 to a shoulder 34 formed within the opening 36 in first slip socket 20. The same configuration is employed with the second right angle connector 16, where a first end 29 thereof has an outside diameter which is sized for a frictional coupling within the second opening 37 formed at the end of the second slip socket 22 which extends from the exterior edge 32 of the second slip socket 22 to a shoulder 34 within the second opening 37. The frictional engagements may be glued or otherwise made permanent once the components of the system 10 have been engaged and rotated to align with both ends of an existing pipe 26 which is being repaired.

On the first end 28 of the first right angled connector 14, and the first end 29 of the second right angled connector 16, which are configured as noted for engagements within the first and second openings 36 and 37, is positioned a slide line 38. This may be embossed into the exterior surface or printed thereon or drawn thereon. These slide lines 38 are located on the desirable insertion slide distance into the respective openings, such as that shown in FIG. 3. The slide line 38 of an inserted first end 28 or 29 of the right angled connector 14 and second angled connector 16, will be visible and align with the external edge 32 surrounding the opening of the first slip socket 20 and the second external edge surrounding the second opening to the second slip socket 22 to visually show the user that proper engagement has occurred to minimize the interruption of fluid flow.

Figures 4, 4A:
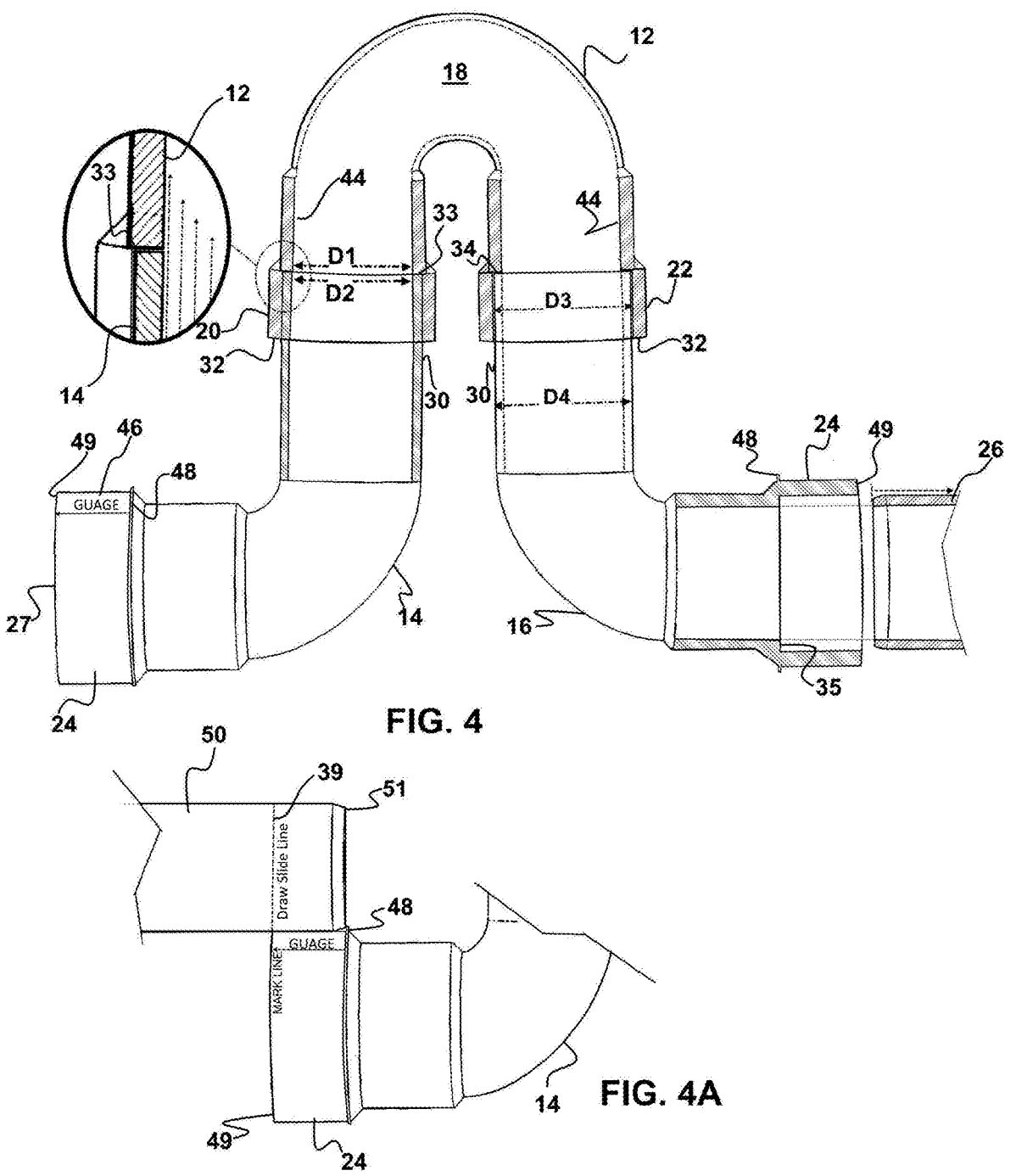
FIG. 4 shows a sectional view, though common with all of the components herein, wherein the internal diameter of the fluid conduit within all three components is substantially equal and aligned, and shows the proper seating of the end edges of the right angle connectors to eliminate gaps in the sidewall and thereby form a continuous internal surface to minimize turbulence.
FIG. 4A depicts the employment of the provided measuring gauge to allow the user to mark the linear engagement end of the right angle connector to be inserted into the slip socket of the U-shaped connector, and thereby provide the user a visual confirmation of a slide line which will show the pieces will be properly abutted, such as in FIG. 4.
Figure 5:
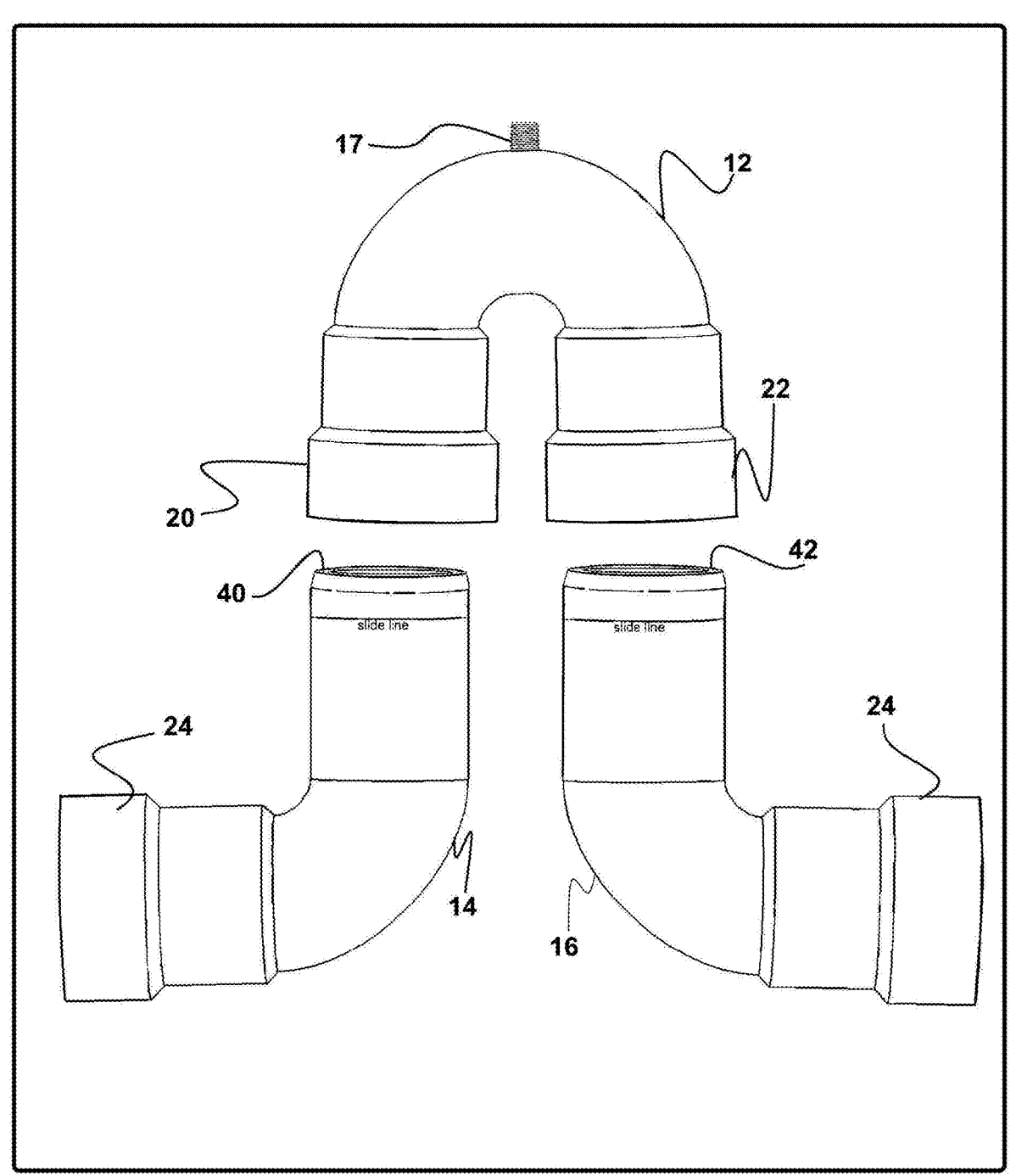
FIG. 5 shows a configuration of the components where the U-shaped center connector includes a threaded projection therefrom employable to repair a broken sprinkler the positioning of a new sprinkler engaged therewith.

As can be seen in FIGS. 3-4, insertion to alignment of the slide line 38 with an external edge 32, shows that the endwall 40 of the first right angle connector 14 is in contact against the ledge 33 within the first opening 36, or the endwall 42 of the second right angle connector 16 is in contact with the shoulder 34 within the second opening 37. This as shown in FIG. 4, forms a smooth interior wall 44 of the assembled components with minimal or no gaps or recesses therein, which would cause the laminar flow of fluid therethrough to a more turbulent fluid flow. The alignment of the slide line 38 with the exterior edges 32 also gives the user a visual confirmation the components are properly seated and allows for disengagement and re-engagement thereof to align the ends with existing pipes 26 before cementing the components in place.

When the system 10 is employed with the second right angle connector 16 as in FIG. 2, or where the existing pipe is to be inserted in the first slip socket 24 or second slip socket on the second right angle connector 16, the system 10 provides a visual measuring gauge 46. The gauge 46 is a distance from the exterior edge 49 of the connector slip sockets 24 to a second end 25 of the connector slip sockets 24. This gauge 46 may also be positioned on the first slip socket 20 and/or the second slip socket 22 of the U shaped connector 12.

A ridge 48 may be formed at the second end 25 of the connector slip sockets 24 allowing the user to simply slide the pipe to be cut 50 to a contact of the edge 51 thereof against the ridge 48. The distance from the ridge 48, or second end of the slip socket, is substantially equal to the distance from the edge 32 of the first slip socket 20 and second slip socket 22 to the shoulder 33 and 34 within respective openings. That distance is also substantially equal to the distance from the exterior edge 49 of the connector slip sockets 24 and the shoulder 35 within the connector slip socket openings 27.

A drawn slide line 39 may be imparted to the pipe to be inserted 50, which will provide the user with the ability to ascertain a proper seating to the edge 51 of the pipe being inserted 50 against the shoulder 35 within the openings 27 in either of the connector slip sockets 24.

As such, whether there is a printed or embossed slide line 38 or a drawn slide line 39, aligning such with an edge 32 will provide visual confirmation that a proper insertion has occurred to form a smooth interior wall 44 along the formed fluid pathway through the opening 27 for one of the right angle connectors and through the interior passage 18 and through the second right angle connector 16 to the opening 27 therein.

Figure 6:
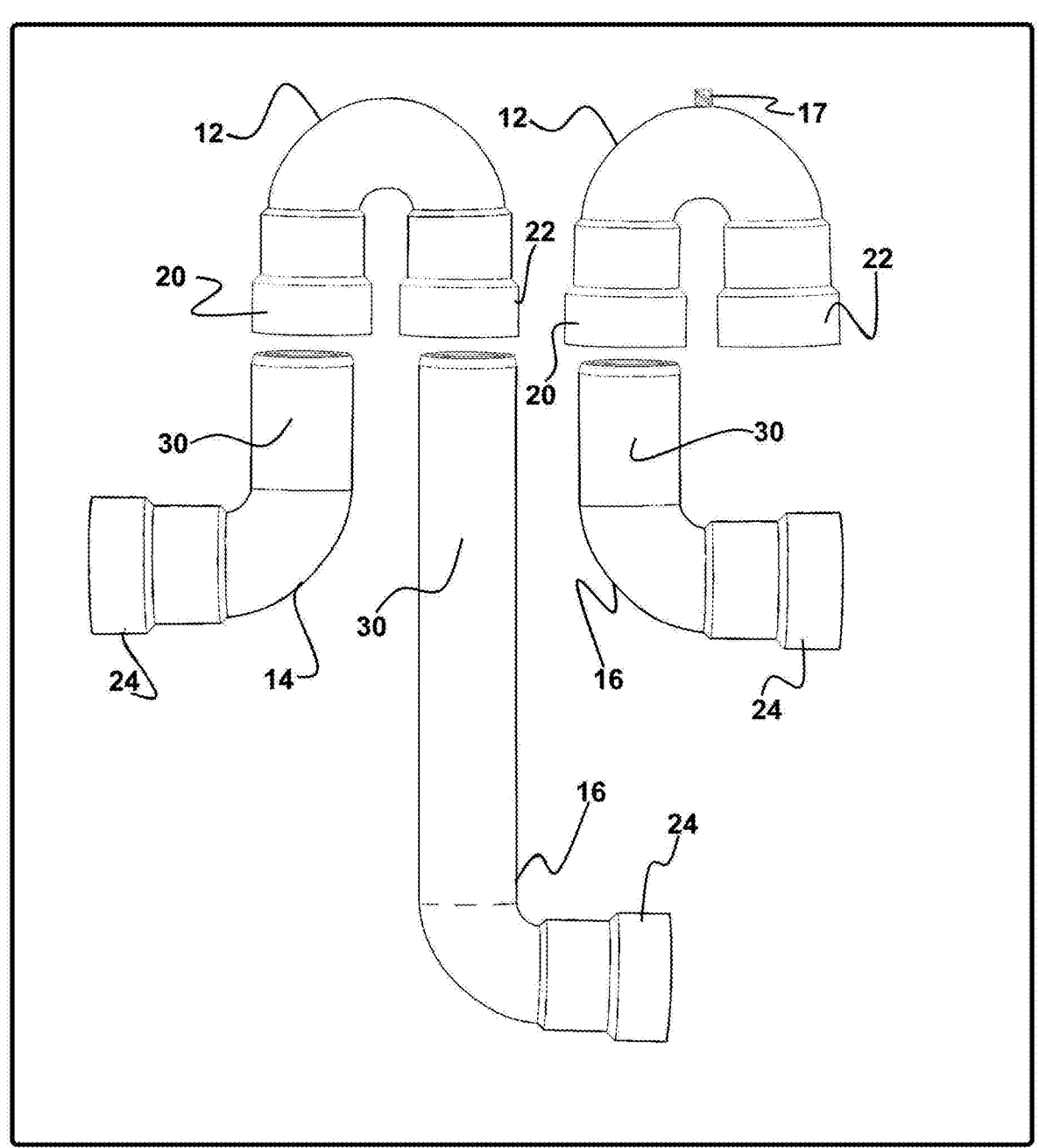
FIG. 6 shows the system provided in a larger kit configuration having at least one right angle connector having an elongated engagement end, and two U-shaped center connectors wherein one has a threaded projection therefrom.

As noted, the system 10 may be formed as a kit such as that in FIG. 6, wherein multiple second right angle connectors 16 are provided with differing lengths of straight portions thereof, such that they may be cut to a desired size. Also, the U-shaped connector 12 may also be provided with a projecting nipple 17 thereon, which has an axial passage communicating with the interior passage 18 so a hose or sprinkler or the like may be engaged to the nipple 17, such as where a broken sprinkler pipe is being repaired.

Figures 7, 8, 9:
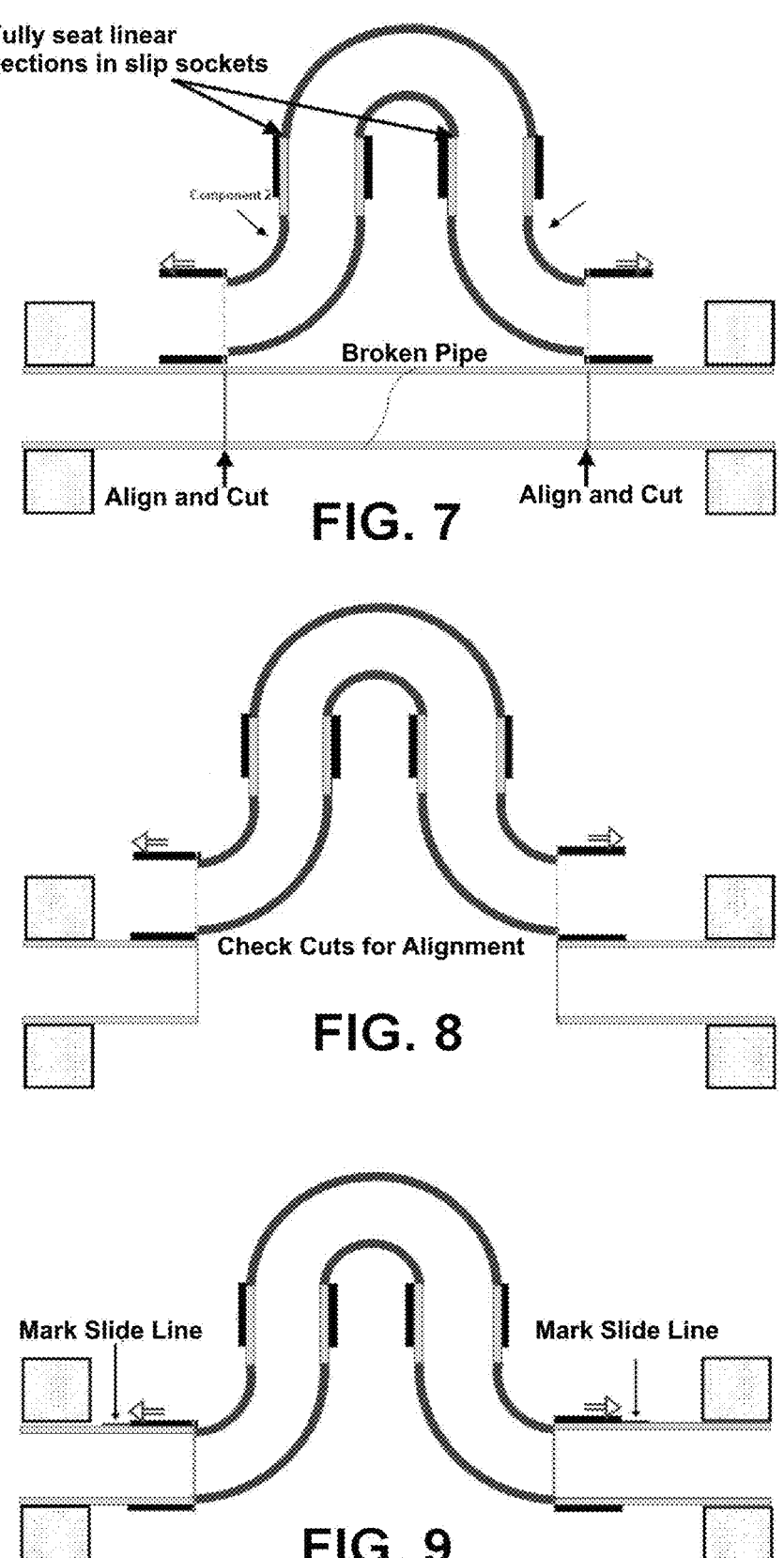
FIGS. 7-14 shows steps in a method of employment of the repair system herein and provided slide lines thereon, to cut and replace an aligned linear section of broken pipe.
Figure 10:
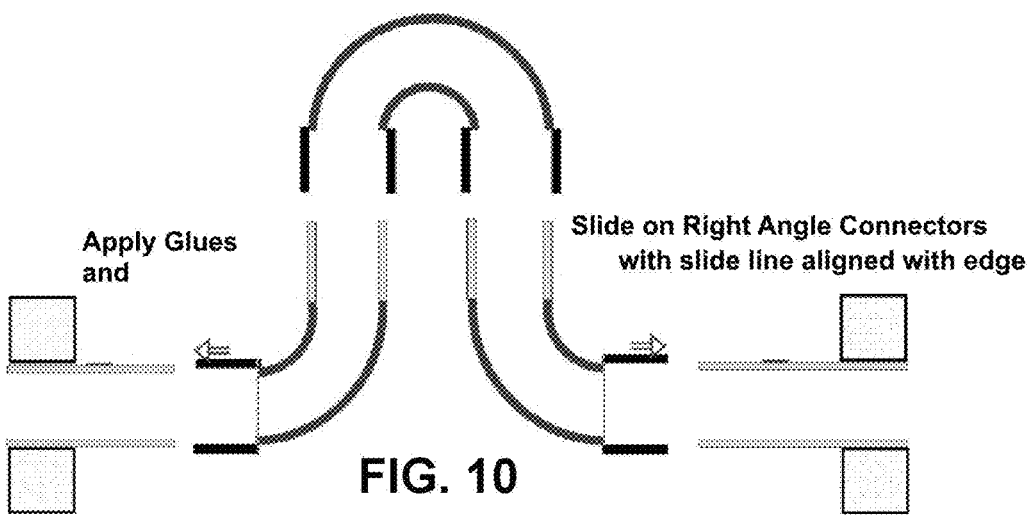
Figure 11:
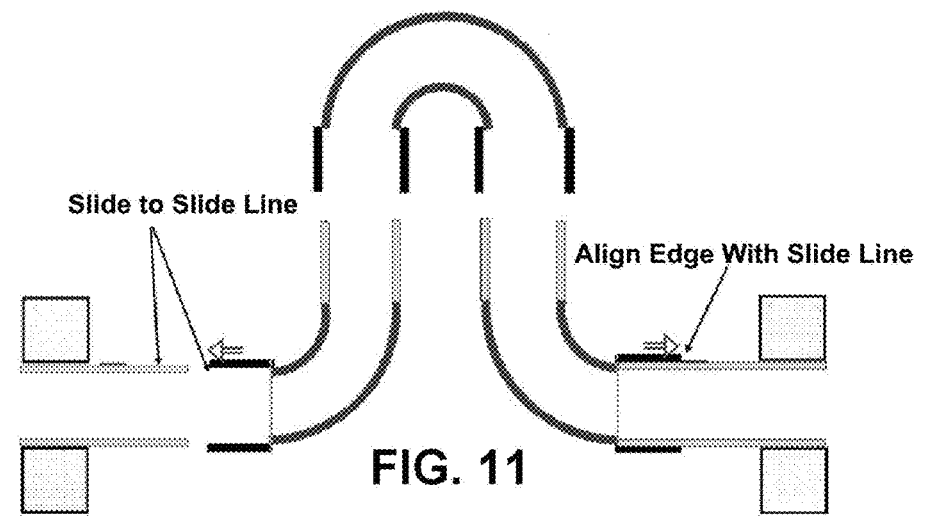

FIGS. 7-14 shows steps in a method of employment of the repair system herein and provided visual gauges thereon, to cut and replace an aligned linear section of broken pipe. As shown in FIG. 7, with the connections only in frictional fits the U-shaped connector 12 is engaged with the first right angle connector 14 and second right angle connector 16. The right angle connectors 14 and 16 are rotated within their engagements to the U-shaped connector 12, such that the pipe being repaired 26 as in figure.

Once so aligned as shown in FIG. 9, the user may mark the pipe to be repaired 26 to proper lengths by using the gauge as in FIG. 4A to insure proper insertion of both ends of the pipe being repaired 26 to seat against the shoulder 35 in the connector slip sockets 24.

With the pipe being repaired 26 properly trimmed, the components are separated and the first right angle connector 14 is slid upon one end of the pipe being repaired 26 and the second right angle connector 16 is slid upon the second end of the pipe being repaired 26. They may be cemented to these engagements once the user is sure the U-shaped connector 12 will engage thereupon.

Figure 12:
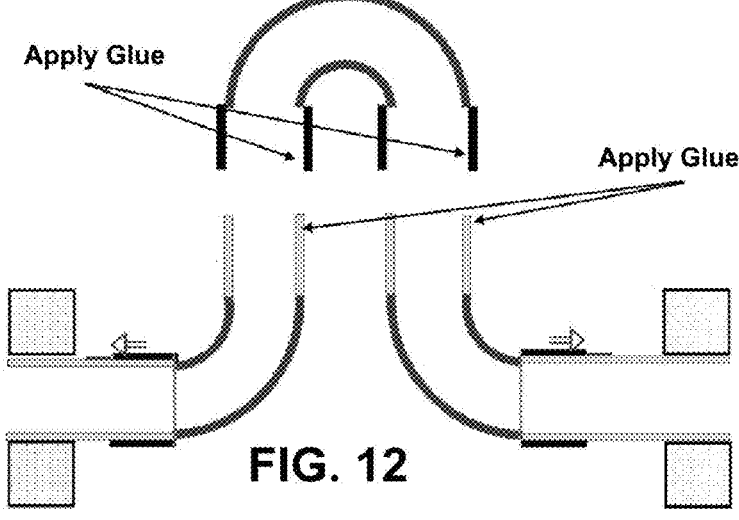
Figure 13:
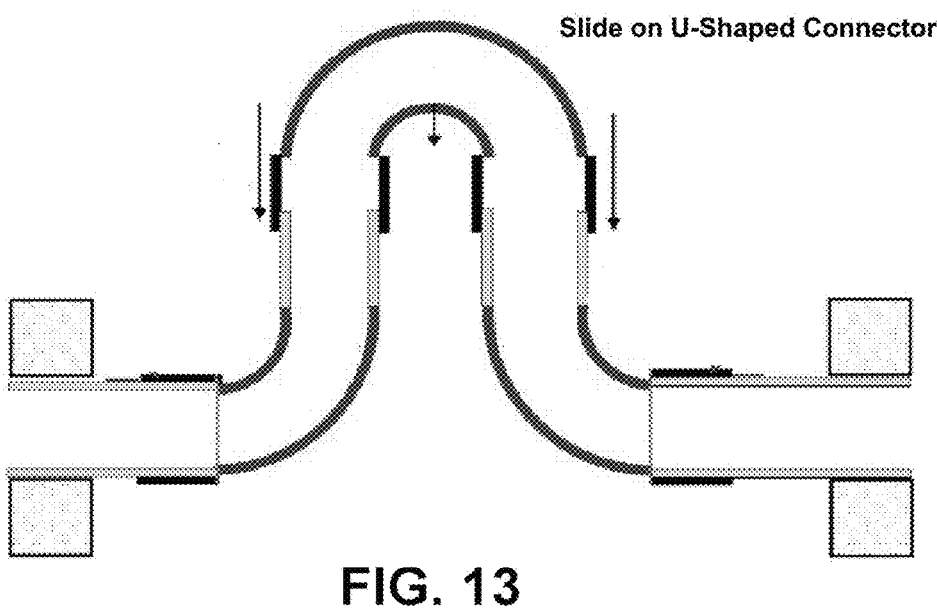
Figure 14:
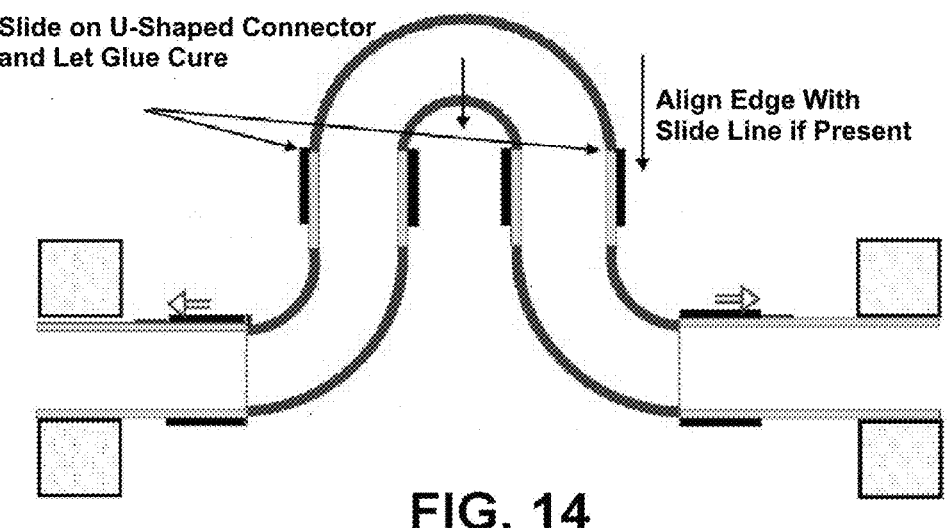

With the two right angle connectors 14 and 16 in a cemented engagement with the pipe being repaired 26, the first ends thereof may be engaged with opposing end openings of the U-shaped connector 12, as shown in FIGS. 12-14.

Figure 15:
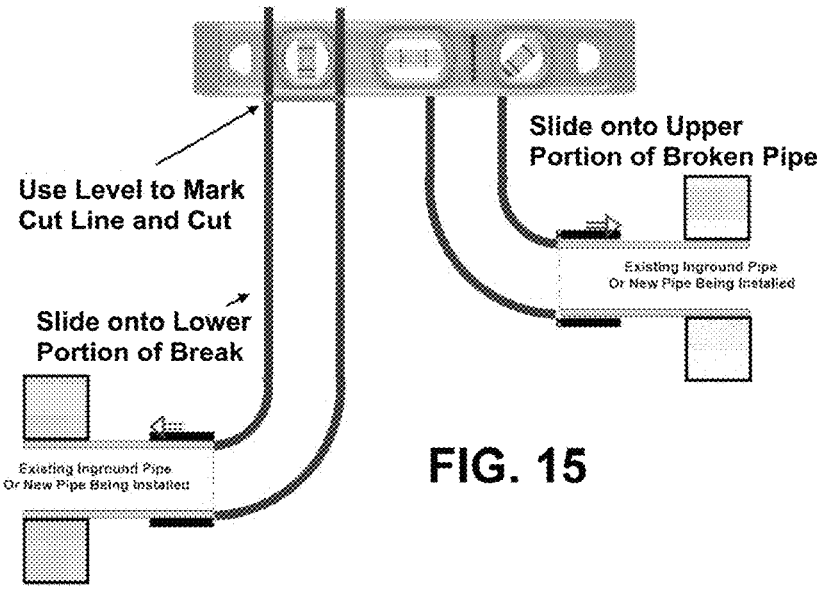
FIGS. 15-16 depicts a method of employment of the components of the system herein to repair or connect incoming and outgoing supply pipes at different elevations.
Figure 16:
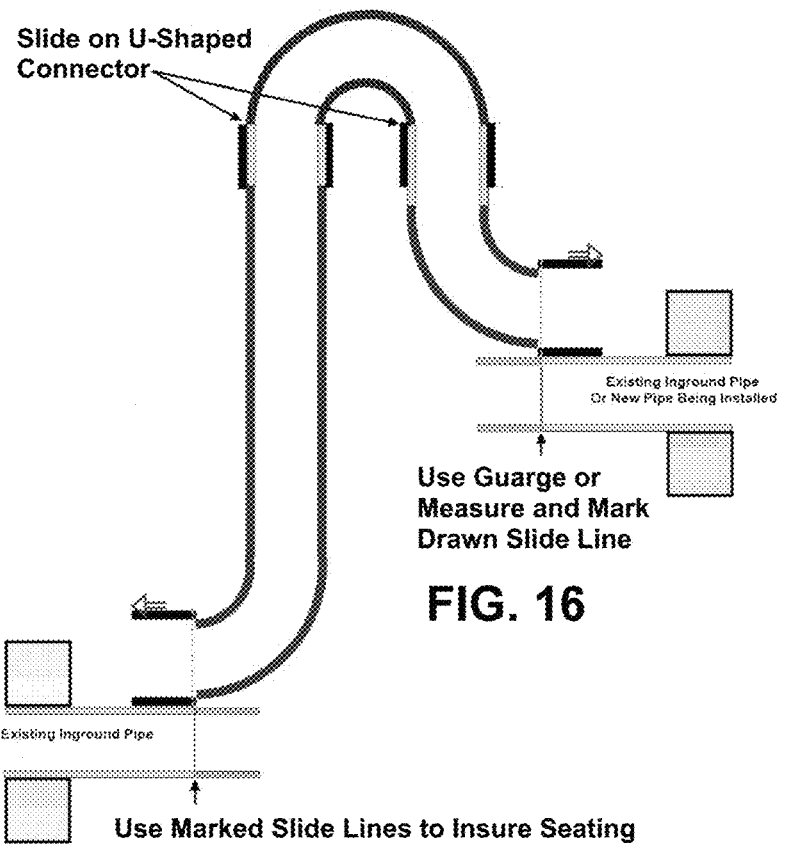

The same method of employment is shown in FIGS. 15-16 except that an elongated second right angle connector 16 is employed and may be trimmed, as noted herein, to engage with both ends of a pipe being repaired 26 where those ends are at different elevations.

Figure 17:
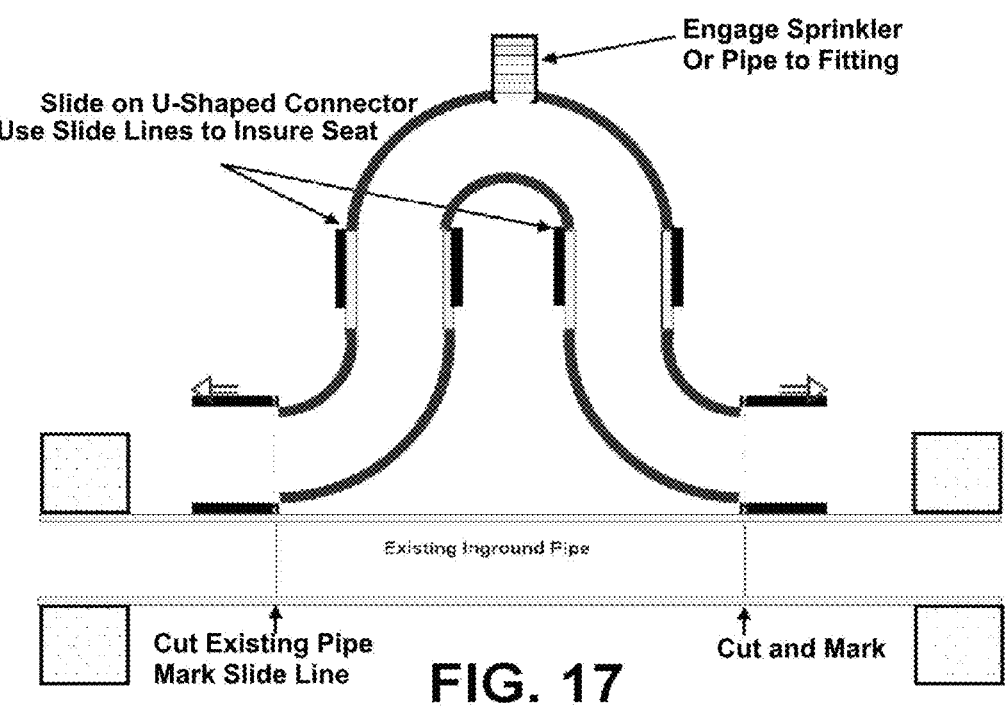
FIGS. 17-18 show steps in the employment of a mode of the system herein, to either replace a broken section of pipe having a sprinkler or to add a new sprinkler to an existing supply line.
Figure 18:
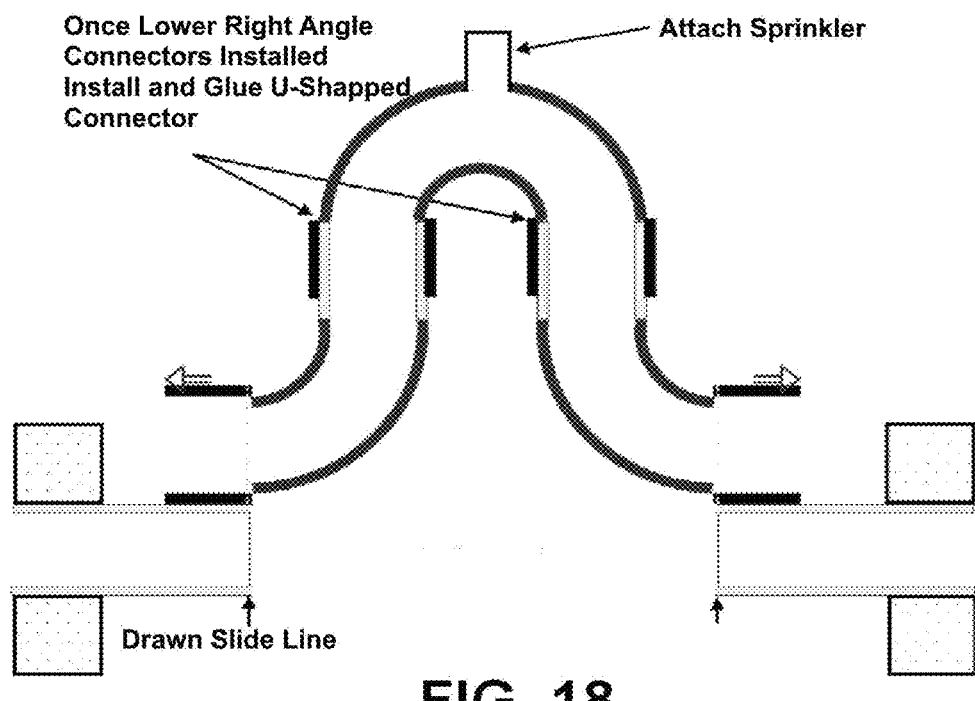

The depictions of FIGS. 17-18 show the U-shaped connector 12 having the projecting nipple 17, which is engageable to sprinklers and threaded pipe fittings. The method of engagement of the components of FIGS. 17-18 would be the same as 10-14 or 15-16 depending on the elevations of both ends of the pipe being repaired 26. Once the components are cemented in permanent couplings, a sprinkler, hose, or threaded pipe fitting may be engaged to the projecting nipple 17 and fluid flowing through the system 10 will flow through the projecting nipple 17.

While all of the fundamental characteristics and features of the universal pipe repair system have been shown and described herein, with reference to particular embodiments thereof, a latitude of modification, various changes and substitutions are intended in the foregoing disclosure and it will be apparent that in some instances, some features of the universal pipe repair invention may be employed without a corresponding use of other features without departing from the scope of the invention as set forth. It should also be understood that various substitutions, modifications, equivalent variations may be made by those skilled in the art without departing from the spirit or scope of the invention. Consequently, all such modifications and variations and substitutions are included within the scope of the invention as defined by the following claims.

What is claimed is:

1. A pipe repair apparatus positionable to a repair position in a gap between two sections of a broken pipe, comprising:

a U-shaped connector having an internal passage communicating between a first opening at a first edge of a first slip socket at one end of said U-shaped connector and a second opening at a second edge of a second slip socket at an opposite end of said U-shaped connector, said internal passage having a constant diameter between said first slip socket and said second slip socket;

a first right angle connector having a first passageway extending between a first connector opening of a first connector slip socket at a one end of said right angle connector to a second connector opening at an engagement end thereof;

a second right angle connector having a second passageway extending between a first connecter opening of a second connector slip socket at a one end of said second right angle connector to a secondary connector opening at an engagement end thereof;

said engagement end of said first right angle connector positionable to a first coupling within said first slip socket;

said engagement end of said second right angle connector positionable to a second coupling within said second slip socket;

said first right angle connector rotatable in said first coupling for aligning said second connector opening for insertion of a first end of said broken pipe therein in a first connection;

said second right angle connector rotatable in said second coupling for aligning said secondary connector opening for insertion of a second end of said broken pipe therein in a second connection;

wherein said first connector slip socket includes an exterior edge and a second end opposite said exterior edge, and a raised annular ridge extending around said first connector slip socket at said second end.

2. The pipe repair apparatus of claim 1 additionally comprising:

a first shoulder within said first slip socket, said first shoulder spaced a slide distance from said first opening;

a second shoulder within said second slip socket, said second shoulder spaced said slide distance from said second opening;

a first edge at said engagement end of said first right angle connector positionable to a first contact against said first shoulder when positioned to said first coupling;

a second edge at said engagement end of said second right angle connector positionable to a second contact against said second shoulder when positioned to said second coupling, whereby said first contact against said first shoulder and said second contact against said second shoulder form substantially smooth pathways for fluid flow therethrough.

3. The pipe repair apparatus of claim 2 additionally comprising:

a first slide line positioned upon an exterior surface of said first right angle connector at a first position spaced a first distance from said first edge thereof;

a second slide line positioned upon an exterior surface of said second right angle connector at a second position spaced a second distance from said second edge thereof;

said first slide line forming a first alignment with said first slip socket which is visible with said first right angle connector positioned to said first coupling; and said second slide line forming a second alignment with said second edge which is visible with said second right angle connector positioned to said second coupling, whereby proper insertion of said first and second right angle connectors is determinable by viewing said first alignment and said second alignment.

4. The pipe repair apparatus of claim 3, additionally comprising:

said first right angle connector having a first curved section extending from said first connector slip socket to a first linear section extending to said second connector opening;

said second right angle connector having a second curved section extending from said second connector slip socket to a second linear section extending to said secondary connector opening; and said second linear section being longer than said first linear section, whereby said second linear section may be trimmed prior to forming said second coupling.

5. The pipe repair apparatus of claim 4 additionally comprising:

a gauge positioned on an exterior surface of said first right angle connector;

said gauge configured for marking a drawn said slide line on an exterior surface of said second right angle connector a distance from a distal edge of said second linear section after a trimming thereof; and said drawn side line forming said second alignment with said second edge.

6. The pipe repair apparatus of claim 5 additionally comprising:

said gauge including said raised annular ridge extending from said exterior surface positioned for contact of said distal edge therewith.

7. The pipe repair apparatus of claim 2, additionally comprising:

said first right angle connector having a first curved section extending from said first connector slip socket to a first linear section extending to said second connector opening;

said second right angle connector having a second curved section extending from said second connector slip socket to a second linear section extending to said secondary connector opening; and said second linear section being longer than said first linear section, whereby said second linear section may be trimmed prior to forming said second coupling.

8. The pipe repair apparatus of claim 1, additionally comprising:

said first right angle connector having a first curved section extending from said first connector slip socket to a first linear section extending to said second connector opening;

said second right angle connector having a second curved section extending from said second connector slip socket to a second linear section extending to said secondary connector opening; and said second linear section being longer than said first linear section, whereby said second linear section may be trimmed prior to forming said second coupling.

9. The pipe repair apparatus of claim 1 additionally comprising:

a gauge positioned on an exterior surface of said U-shaped connector adjacent said first opening at said first edge of said first slip socket;

said gauge having an annular ridge extending from said exterior surface;

said annular ridge forming a contact point for a distal edge of said engagement end of said second right angle connector thereon; and said first edge defining a position for marking a drawn said slip line of said second right angle connector while said distal edge is touching said contact point.

10. The pipe repair apparatus of claim 1, wherein a distance from said raised annular ridge to said exterior edge is the same as a distance from a shoulder within said first connector slip socket and said exterior edge.

11. A pipe repair apparatus positionable to a repair position in a gap between two sections of a broken pipe, comprising:

a U-shaped connector having a U-shaped curve and an internal passage communicating between a first opening at a first edge of a first slip socket at one end of said U-shaped connector and a second opening at a second edge of a second slip socket at an opposite end of said U-shaped connector, said internal passage having a constant diameter between said first slip socket and said second slip socket, and a projection exiting from a central area of said U-shaped curve for coupling to a sprinkler;

a first right angle connector having a first passageway extending between a first connector opening of a first connector slip socket at a one end of said right angle connector to a second connector opening at an engagement end thereof;

a second right angle connector having a second passageway extending between a first connecter opening of a second connector slip socket at a one end of said second right angle connector to a secondary connector opening at an engagement end thereof;

said engagement end of said first right angle connector positionable to a first coupling within said first slip socket;

said engagement end of said second right angle connector positionable to a second coupling within said second slip socket;

said first right angle connector rotatable in said first coupling for aligning said second connector opening for insertion of a first end of said broken pipe therein in a first connection;

said second right angle connector rotatable in said second coupling for aligning said secondary connector opening for insertion of a second end of said broken pipe therein in a second connection.

12. The pipe repair apparatus of claim 11 additionally comprising:

a first shoulder within said first slip socket, said first shoulder spaced a slide distance from said first opening;

a second shoulder within said second slip socket, said second shoulder spaced said slide distance from said second opening;

a first edge at said engagement end of said first right angle connector positionable to a first contact against said first shoulder when positioned to said first coupling;

a second edge at said engagement end of said second right angle connector positionable to a second contact against said second shoulder when positioned to said second coupling, whereby said first contact against said first shoulder and said second contact against said second shoulder form substantially smooth pathways for fluid flow therethrough.

13. The pipe repair apparatus of claim 12 additionally comprising:

a first slide line positioned upon an exterior surface of said first right angle connector at a first position spaced a first distance from said first edge thereof;

a second slide line positioned upon an exterior surface of said second right angle connector at a second position spaced a second distance from said second edge thereof;

said first slide line forming a first alignment with said first slip socket which is visible with said first right angle connector positioned to said first coupling; and said second slide line forming a second alignment with said second edge which is visible with said second right angle connector positioned to said second coupling, whereby proper insertion of said first and second right angle connectors is determinable by viewing said first alignment and said second alignment.

14. The pipe repair apparatus of claim 13, additionally comprising:

said first right angle connector having a first curved section extending from said first connector slip socket to a first linear section extending to said second connector opening;

said second right angle connector having a second curved section extending from said second connector slip socket to a second linear section extending to said secondary connector opening; and said second linear section being longer than said first linear section, whereby said second linear section may be trimmed prior to forming said second coupling.

15. The pipe repair apparatus of claim 14 additionally comprising:

a gauge positioned on an exterior surface of at least one of said U-shaped connector and said first right angle connector;

said gauge configured for marking a drawn said slide line on an exterior surface of said second right angle connector a distance from a distal edge of said second linear section after a trimming thereof; and said drawn side line forming said second alignment with said second edge.

16. The pipe repair apparatus of claim 15 additionally comprising:

said gauge having an annular ridge extending from said exterior surface positioned for contact of said distal edge therewith.

17. The pipe repair apparatus of claim 12, additionally comprising:

said first right angle connector having a first curved section extending from said first connector slip socket to a first linear section extending to said second connector opening;

said second right angle connector having a second curved section extending from said second connector slip socket to a second linear section extending to said secondary connector opening; and said second linear section being longer than said first linear section, whereby said second linear section may be trimmed prior to forming said second coupling.

18. The pipe repair apparatus of claim 11, additionally comprising:

said first right angle connector having a first curved section extending from said first connector slip socket to a first linear section extending to said second connector opening;

said second right angle connector having a second curved section extending from said second connector slip socket to a second linear section extending to said secondary connector opening; and said second linear section being longer than said first linear section, whereby said second linear section may be trimmed prior to forming said second coupling.

19. The pipe repair apparatus of claim 11 additionally comprising:

a gauge positioned on an exterior surface of said U-shaped connector adjacent said first opening at said first edge of said first slip socket;

said gauge having an annular ridge extending from said exterior surface;

said annular ridge forming a contact point for a distal edge of said engagement end of said second right angle connector thereon; and said first edge defining a position for marking a drawn said slip line of said second right angle connector while said distal edge is touching said contact point.

20. The pipe repair apparatus of claim 11, wherein said projection is a threaded projection.

* * * * *